(12) United States Patent  
Liu et al.

(10) Patent No.: US 8,501,337 B2
(45) Date of Patent: Aug. 6, 2013

(54) PORTABLE ELECTRONIC DEVICE WITH SPARE BATTERY

(75) Inventors: Yan-Long Liu, Shenzhen (CN); Hsiao-Hua Tu, Shindian (TW); Jun Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 650 days.

(21) Appl. No.: 12/693,647

(22) Filed: Jan. 26, 2010

(65) Prior Publication Data

US 2011/0033739 A1    Feb. 10, 2011

(30) Foreign Application Priority Data

Aug. 5, 2009  (CN) .......................... 2009 1 0305264

(51) Int. Cl.
*H01M 2/02* (2006.01)
(52) U.S. Cl.
USPC .......................................... 429/100; 429/96
(58) Field of Classification Search
USPC .................................................. 429/96–100
See application file for complete search history.

(56) References Cited

U.S. PATENT DOCUMENTS

| 4,206,274 A * | 6/1980 | Peels ............................... 429/99 |
| 4,384,031 A * | 5/1983 | Kline ............................. 429/176 |
| 5,935,729 A * | 8/1999 | Mareno et al. ................. 429/100 |
| 6,071,639 A * | 6/2000 | Bryant et al. ................... 429/97 |
| 6,455,188 B1 * | 9/2002 | McKay et al. .................. 429/97 |
| 7,322,835 B2 * | 1/2008 | Lin et al. ......................... 439/96 |
| 2003/0013506 A1 * | 1/2003 | Wang ............................ 455/573 |
| 2003/0224243 A1 * | 12/2003 | Maeda ............................ 429/100 |
| 2004/0214077 A1 * | 10/2004 | Huang ............................ 429/97 |
| 2007/0015477 A1 | 1/2007 | Tu et al. |
| 2007/0037048 A1 | 2/2007 | Takeshita et al. |
| 2007/0172724 A1 * | 7/2007 | Furth et al. ...................... 429/97 |

FOREIGN PATENT DOCUMENTS

| CN | 1172355 A | 2/1998 |
| TW | 487226 | 5/2002 |

* cited by examiner

Primary Examiner — Maria J Laios
(74) Attorney, Agent, or Firm — Altis Law Group, Inc.

(57) ABSTRACT

A portable electronic device includes a housing defining a first chamber and a second chamber and forming a separating wall between the first chamber and the second chamber, and a cover attaching to the housing. Two batteries are respectively received in the first chamber and the second chamber.

11 Claims, 4 Drawing Sheets

PORTABLE ELECTRONIC DEVICE WITH SPARE BATTERY

BACKGROUND

1. Technical Field

The present disclosure generally relates to portable electronic devices and, particularly, to a portable electronic device with a spare battery.

2. Description of Related Art

Batteries are widely used in portable electronic devices, such as personal digital assistants (PDAs), mobile phones, and so on. Conventionally, only one battery is used in the electronic device. Since portable electronic devices provide so many functions now, a user may run down the single battery quickly.

Therefore, there is room for improvement within the art.

BRIEF DESCRIPTION OF THE DRAWINGS

Many aspects of the portable electronic device with two batteries can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

Figure 1:
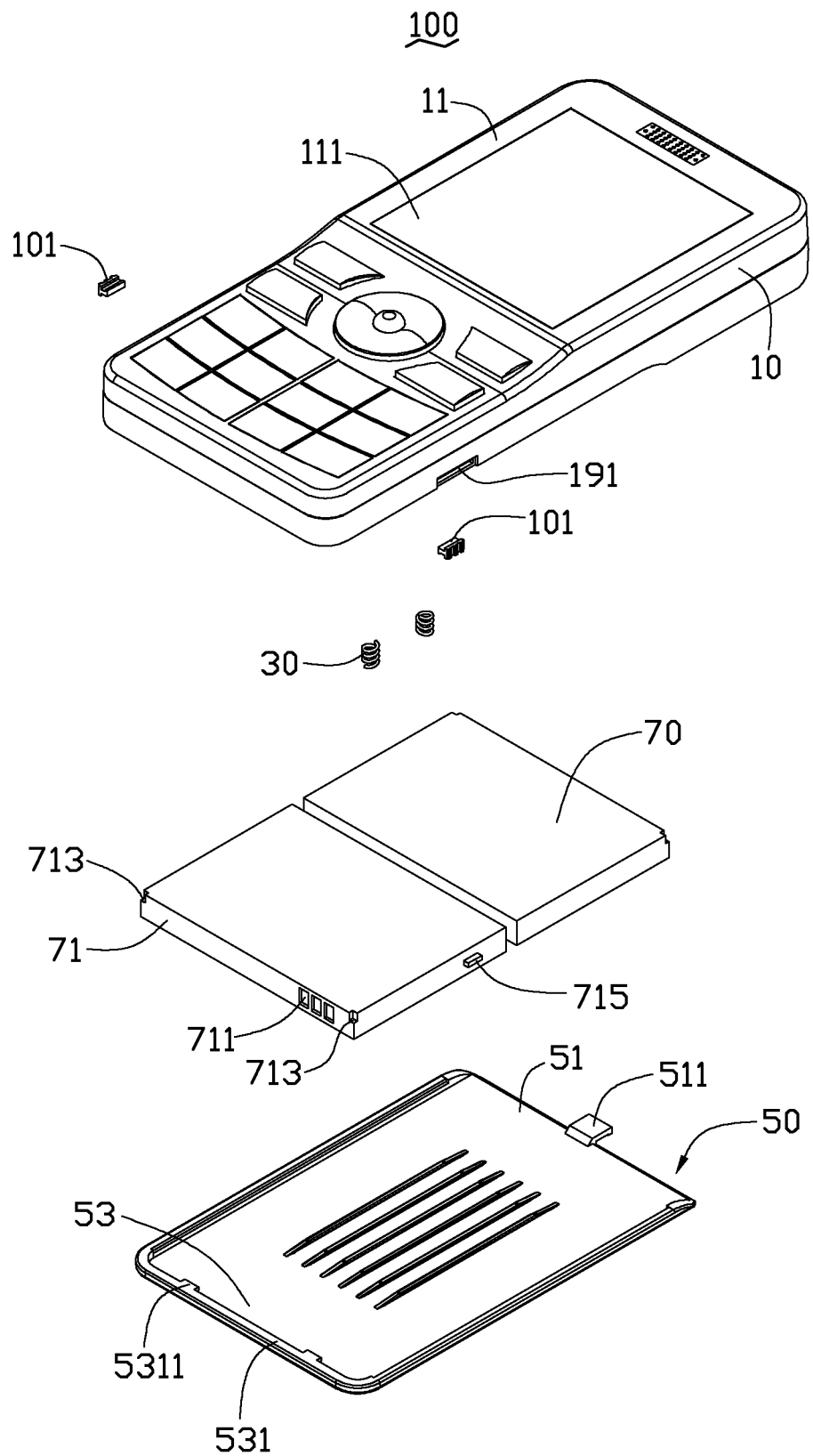
FIG. 1 is an exploded, isometric view of an exemplary embodiment of a portable electronic device with two batteries.
Figure 2:
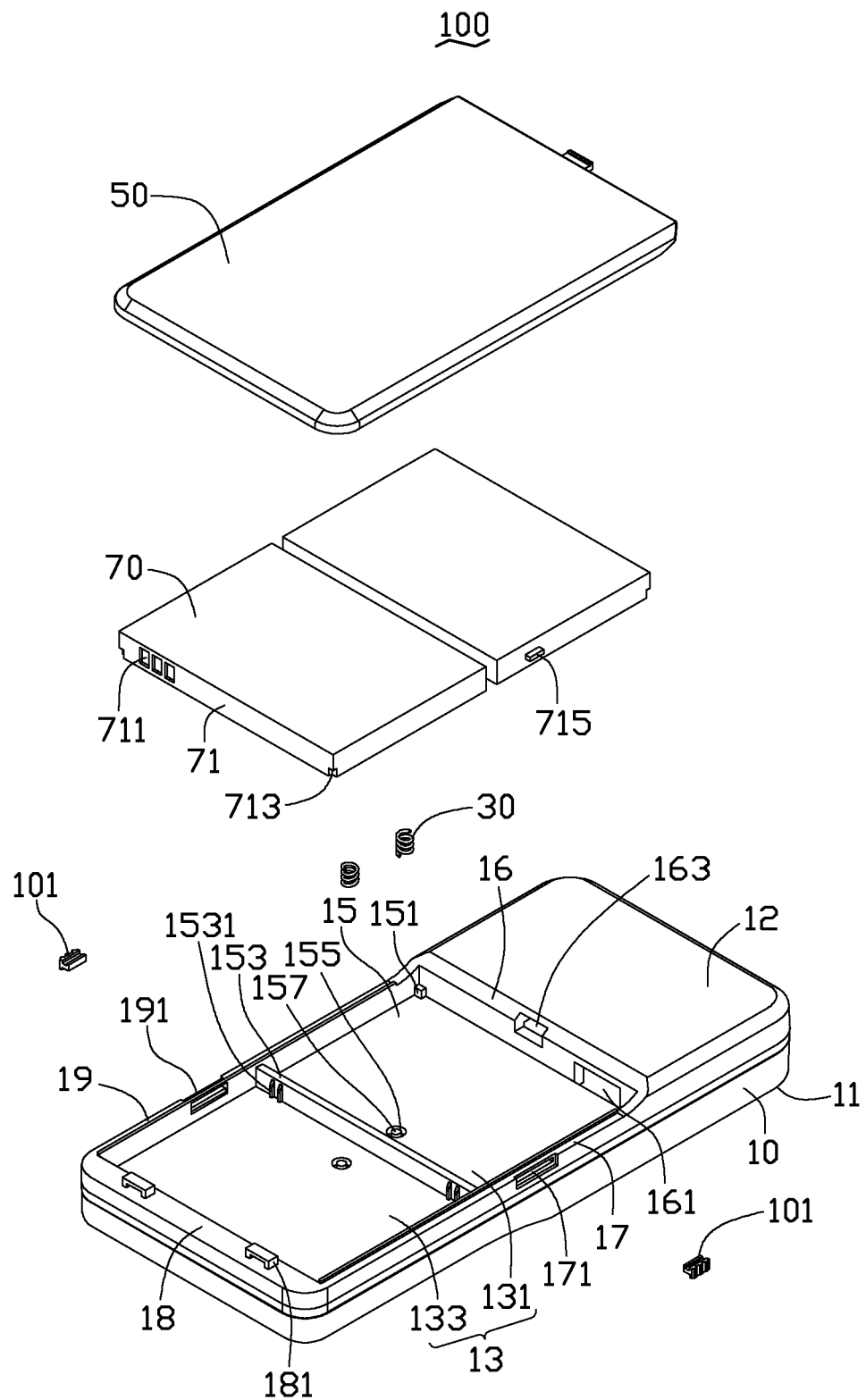
FIG. 2 is similar to FIG. 1, but viewed from another aspect.

FIGS. 1 and 2 show a portable electronic device 100. The portable electronic device includes a housing 10, two springs 30, a cover 50, and two batteries 70. Each spring 30 is fixed to the housing 10 and elastically resisting against a corresponding battery 70. The cover 50 is detachably mounted on the housing 10 and resists the batteries 70.

The housing 10 includes a first surface 11 and a second surface 12 opposite to the first surface 11. A display 111 is formed on the first surface 11.

The second surface 12 defines a receiving space 13 therein. The receiving space 13 is cooperatively surrounded by a first end wall 16, a second end wall 18 opposite to a bottom wall 15, a first sidewall 17, and a second sidewall 19 opposite to the first wall 17.

The bottom wall 15 is approximately rectangular. Each corner of the bottom wall 15 forms a positioning protrusion 151. The positioning protrusion 151 engages with the battery 70. A separating wall 153 extends upwardly from near the middle of the bottom wall 15. The separating wall 153 divides the receiving space 13 into a first chamber 131 and a second chamber 133. The first chamber 131 and the second chamber 133 each receive one of the two batteries 70. Both sides of the separating wall 153 forms several spaced resisting ribs 1531 for elastically resisting against the batteries 70. The bottom wall 15 respectively defines a positioning hole 155 and a post 157 therein in the first chamber 131 and the second chamber 133. The springs 30 are placed around the posts 157. A height of each post 157 is less than or equal to the depth of the corresponding positioning hole 155.

The first end wall 16 defines a connecting portion 161 and a latching hole 163. The connecting portion 161 allows the battery 70 to electronically connect to a printed circular board (PCB, not shown) of the portable electronic device 100. Two spaced positioning frames 181 project upwardly from the second end portion 18.

The first sidewall 17 defines a first hole 171 communicating with the first chamber 131. The second sidewall 19 defines a second hole 191 communicating with the second chamber 133.

The housing 10 further includes two sliding buttons 101, the sliding buttons 101 are slidably mounted on the first hole 171 and the second hole 191.

The cover 50 includes a latching end 51 and a resisting end 53 opposite to the latching end 51. The latching end 51 extends a tab 511 to engage the latching hole 163. A side plate 531 extends from the resisting end 53. The side plate 531 forms two spaced latching portions 5311 to engage the positioning frames 181.

Each battery 70 includes a connecting end 71. The connecting end 71 has several conductive contacts 711 to electronically connect to the PCB. Both sides of the connecting end 71 define a notch 713 to receive the positioning protrusions 151. The side adjacent to the conductive contacts 711 forms a resisting protrusion 715 for elastically resisting the sliding buttons 101.

Figure 3:
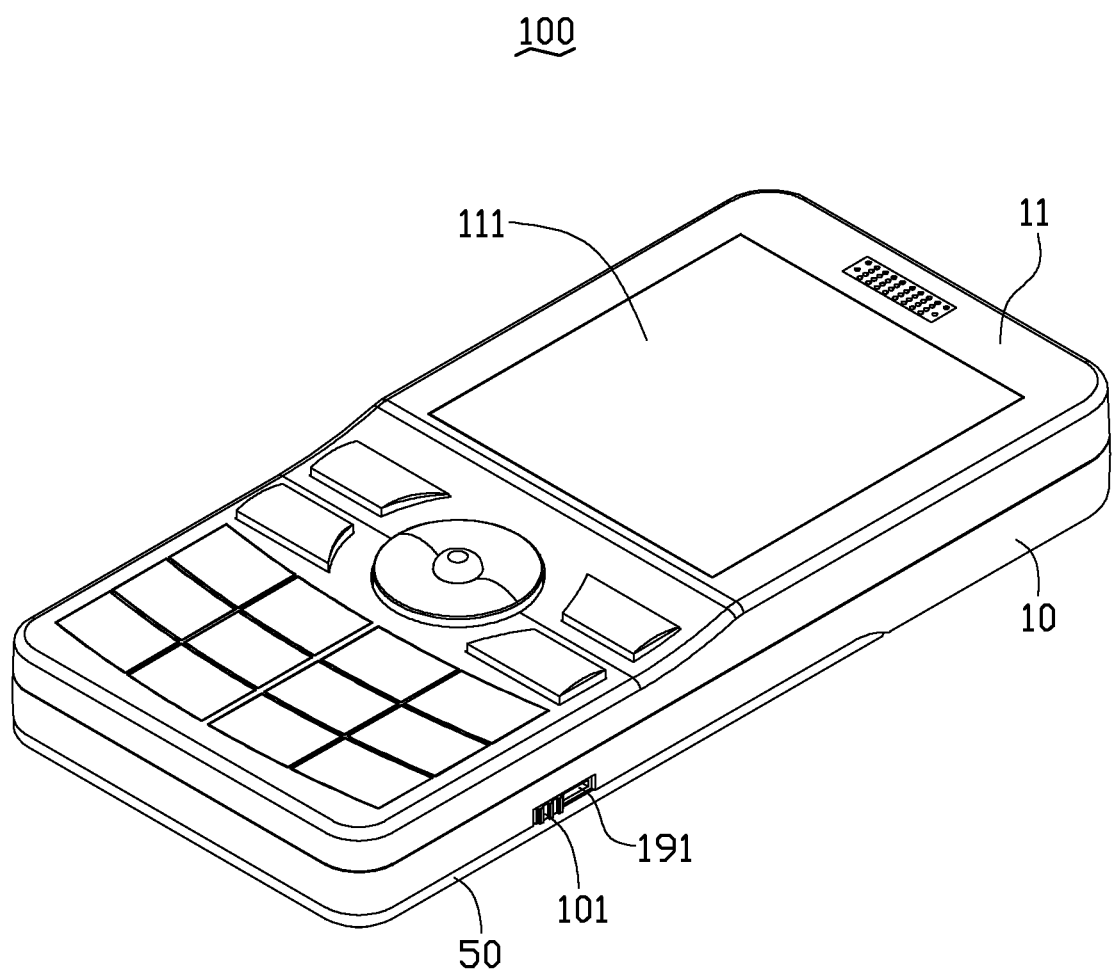
FIG. 3 is an assembled, isometric view of the portable electronic device showing in the FIG. 1.
Figure 4:
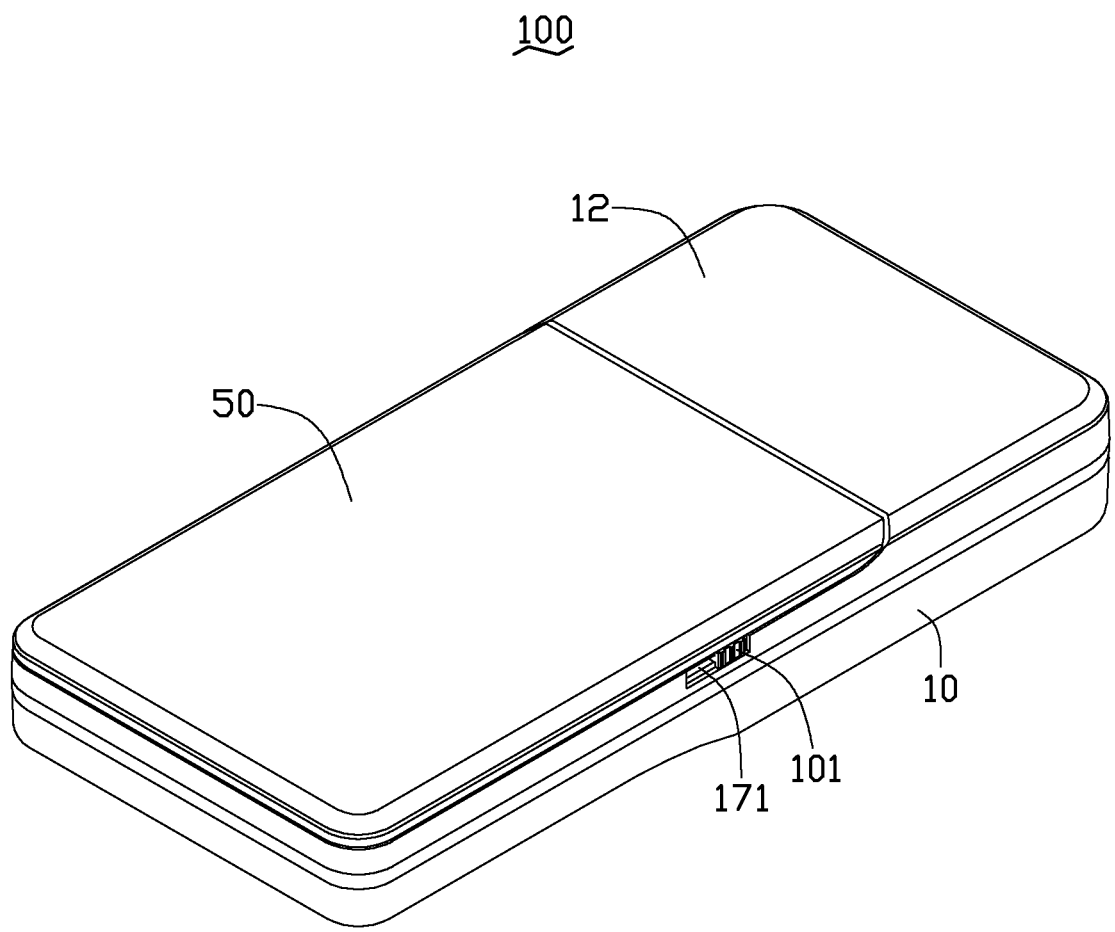
FIG. 4 is an assembled, isometric view of the portable electronic device showing in the FIG. 2.

Referring to FIGS. 3 and 4, when assembling the portable electronic device 100, firstly, the sliding buttons 101 are slidably mounted on the holes 171, 191 of the housing 10. Then, the springs 30 are inserted into the positioning holes 155 and attached to the housing 10. The batteries 70 are placed in the first chamber 131 and the second chamber 133 respectively. The notches 713 of batteries 70 receive the positioning protrusions 151. The resisting ribs 153 resist the batteries 70. Each spring 30 elastically resists the corresponding battery 70 received in the same chamber.

Finally, the cover 50 is latched with the housing 10. The tab 511 is inserted into the latching hole 163, and the latching portions 5311 engage the positioning frames 181 of housing 10. Thus, the portable electronic device 100 is assembled.

The first and second chambers 131 and 133 may be electrically configured any one of several ways. For example, when one battery 70 in one of the chambers 131, 133 runs out of power, then, if the other of the chambers 131, 133 has a charged battery 70 therein, sourcing power for the device 100 is switched to that chamber 131, 133. Then the battery 70 not in use could be removed for charging or replacement. Another example is that only one chamber 131, 133 is wired to supply power to the device 100 and the other chamber 131, 133 is merely used to store a spare battery 70 that can be used to replace the battery 70 in the other chamber 131, 133 as needed. When removing a battery 70, the cover 50 is firstly removed from the housing 10. The battery 70 is ejected from the bottom wall 15 under the force of the springs 30.

It is to be understood, the portable electronic device 100 could further include a control unit to selectively choose which chamber 131, 133 is currently connected to supply power. Furthermore, the number of battery chamber is not limited to two. Additionally, the springs 30 could be omitted.

The present disclosure of the portable electronic device 100 allows the convenient presence of two batteries 70 in the device 100 allowing users longer periods of use between battery charging and/or replacement.

It is believed that the present embodiments and their advantages will be understood from the foregoing description, and it will be apparent that various changes may be made thereto without departing from the spirit and scope of the disclose or sacrificing all of its material advantages, the examples hereinbefore described merely being preferred or exemplary embodiments of the disclose.

What is claimed is:

1. A portable electronic device comprising:

a housing defining a receiving space cooperatively surrounded by a first end wall, a second end wall opposite to the first end wall, a first sidewall, a second sidewall opposite to the first sidewall, and a bottom wall, the housing further including a separating wall, the separating wall positioned on the bottom wall, and connected between the first sidewall and the second sidewall to divide the receiving space into separate first and second chambers spaced apart from each other;

a cover attaching to the housing;

wherein a battery is positioned in each of the first chamber and the second chamber, the corners of the bottom wall forming a positioning protrusion for supporting the battery, and the cover covers the first chamber and the second chamber to retain the battery in the housing; and wherein the battery forms a resisting protrusion on a side, the portable electronic device further includes two sliding buttons; both of the first sidewall and the second wall define a hole communicating with the receiving space to receive the sliding buttons, and the sliding buttons respectively abut against the resisting protrusions of the battery.

2. The portable electronic device as claimed in claim 1, wherein the portable electronic device further includes two springs, each of the first chamber and the second chamber defines a positioning hole on the bottom wall to receiving one of the corresponding springs, one end of each spring elastically resists a battery.

3. The portable electronic device as claimed in claim 2, wherein the first chamber and the second chamber extend a post in each positing hole, the springs are placed around the posts.

4. The portable electronic device as claimed in claim 3, wherein a height of each post is less than or equal to the depth of the corresponding positioning hole.

5. The portable electronic device as claimed in claim 1, wherein both sides of the separating wall form a plurality of spaced resisting ribs made of elastic material, and the resisting ribs resist the battery.

6. A portable electronic device comprising:

a housing defining a receiving space therein, the receiving space cooperatively surround by a first end wall, a second end wall opposite to the first end wall, a first sidewall, a second sidewall opposite to the first sidewall, and a bottom wall;

a cover attaching to the housing;

wherein the portable electronic device further includes two batteries; a separating wall formed on the housing, the separating wall positioned on the bottom wall, and connecting between the first sidewall and the second sidewall for dividing the receiving space into two chambers spaced apart from each other, and each battery is received in one of the chambers and resists the separating wall, the cover covers the two chambers to retain the two batteries in the housing; and wherein each battery forms a resisting protrusion; the portable electronic device further includes two sliding buttons; each sliding button resists one of the resisting protrusions; both the first sidewall and the second wall define a hole communicating with the receiving space to receive the sliding buttons.

7. The portable electronic device as claimed in claim 6, wherein the portable electronic device further includes two springs, each chamber defines a positioning hole on the bottom wall for receiving a corresponding spring, and one end each spring elastically resists a battery.

8. The portable electronic device as claimed in claim 7, wherein each chamber extends a post in each positioning hole, the springs are placed around the posts.

9. The portable electronic device as claimed in claim 7, wherein a height of the post is less than or equal to a depth of the corresponding positioning hole.

10. The portable electronic device as claimed in claim 6, wherein each battery includes one end forming conductive contacts and defines two notches; the bottom wall is approximately rectangular forming a positioning protrusion in each corner to engage the notches and support the batteries.

11. The portable electronic device as claimed in claim 6, wherein both sides of the separating wall form several spaced resisting ribs made of elastic material, the resisting ribs abut against the batteries.

* * * * *